Figure 1:
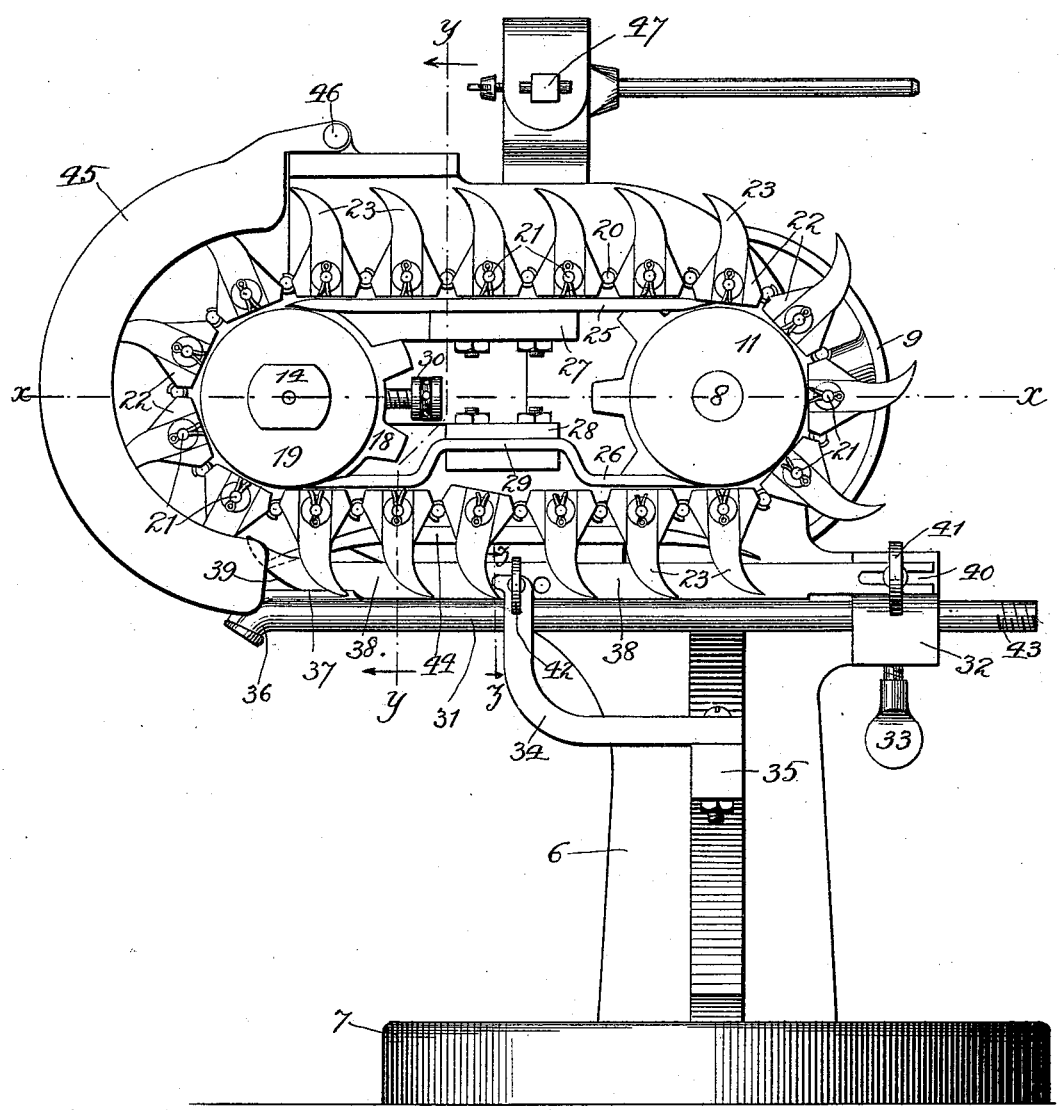

(No Model.)  3 Sheets—Sheet 1.

G. A. LOWRY.
MACHINE FOR CUTTING AND CLEANING ENTRAILS.

No. 550,986. Patented Dec. 10, 1895.

Witnesses
Wm. J. Henning
M. J. Cavanagh

Inventor
George A. Lowry
By Brown & Darby Attys (No Model.) 3 Sheets—Sheet 2.
G. A. LOWRY.
MACHINE FOR CUTTING AND CLEANING ENTRAILS.
No. 550,986. Patented Dec. 10, 1895.
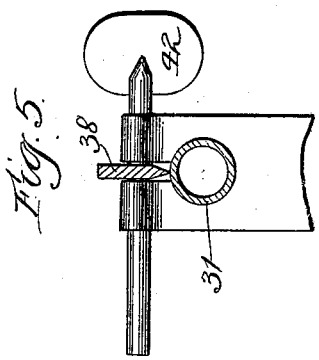
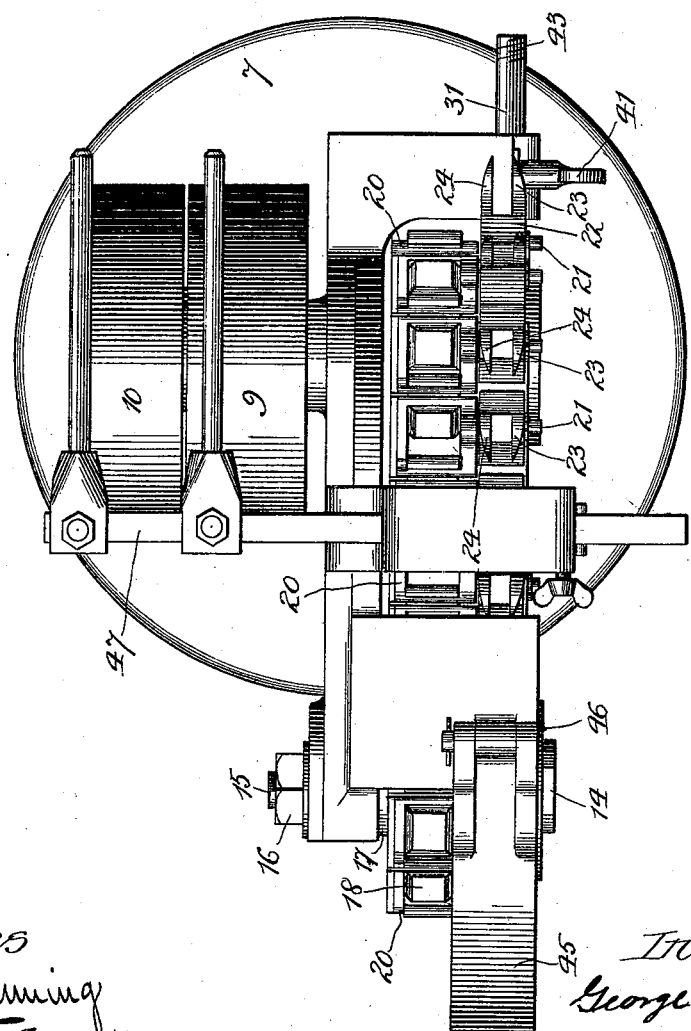
Witnesses
Wm. F. Henning
M. J. Cavanagh
Inventor
George A Lowry
by Brown & Darby Attys.

(No Model.) 3 Sheets—Sheet 3.
G. A. LOWRY.
MACHINE FOR CUTTING AND CLEANING ENTRAILS.
No. 550,986. Patented Dec. 10, 1895.
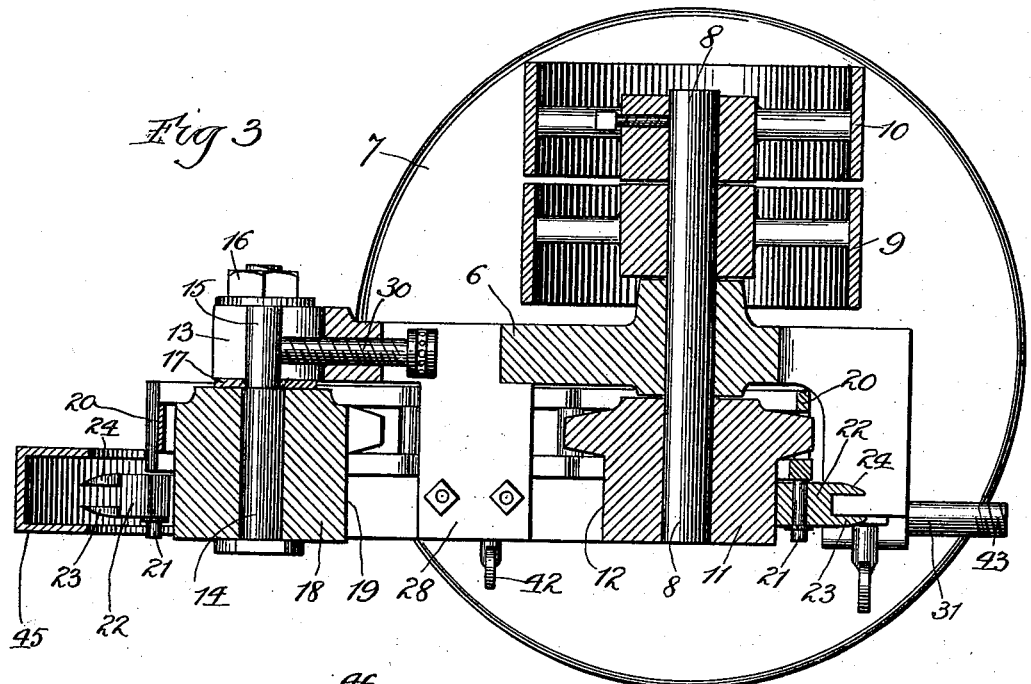
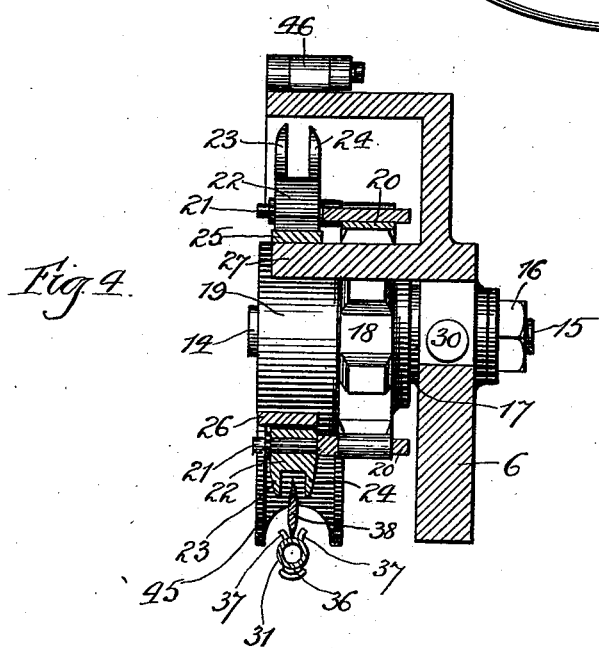
Witnesses
Inventor
George A. Lowry
by Bacon & Darby
Attys.

UNITED STATES PATENT OFFICE.

GEORGE A. LOWRY, OF CHICAGO, ILLINOIS.

MACHINE FOR CUTTING AND CLEANING ENTRAILS.

SPECIFICATION forming part of Letters Patent No. 550,986, dated December 10, 1895.

Application filed February 4, 1895. Serial No. 537,201. (No model.)

*To all whom it may concern:*

Be it known that I, GEORGE A. LOWRY, a citizen of the United States, residing at Chicago, in the county of Cook and State of Illinois, have invented a new and useful Improvement in Machinery for Cutting and Cleaning Entrails, of which the following is a specification.

This invention relates to machines for cutting and cleaning entrails. Its object is to provide a useful machine exceedingly simple in construction and effective in operation for cutting and ripping entrails in slaughtering houses and establishments.

The invention consists substantially in the construction, combination, location, and relative arrangements of parts, all as will be more fully hereinafter described, as shown in the accompanying drawings, and finally pointed out in the appended claims.

Referring to the accompanying drawings and to the various views and reference-signs appearing thereon, Figure 1 is a view in side elevation of the machine complete. Fig. 2 is a plan view of the same. Fig. 3 is a view in horizontal section taken on the line *x x*, Fig. 1. Fig. 4 is a view in vertical transverse section taken on the line *y y*, Fig. 1, looking in the direction of the arrows. Fig. 5 is a sectional detail view taken on the line *z z*, Fig. 1, looking in the direction of the arrows.

The same reference-sign is used to designate the same part wherever it occurs throughout the several views.

Reference-sign 6 designates a suitable framework arranged to support the several operating parts hereinafter referred to. The framework is supported upon any suitable or convenient base-plate or table 7. In a suitable journal-box I mount the driving-shaft 8, upon which are provided the usual fast and loose pulleys 9 10. Upon the opposite end of shaft 8 is mounted a sprocket-wheel 11, the hub of which is provided with an extended surface, as indicated at 12, (see Fig. 3,) for a purpose presently to be described.

In an arm of the casting constituting the framework 6 I provide an open-ended slot 13, (see Fig. 3,) and in the said slot I rigidly secure in any convenient manner the shouldered end of a stud or bolt 14—as, for instance, by means of a set-nut 16 and a washer or collar 17—adapted to engage opposite sides of the casting. The end 15 of stud 14 is screw-threaded a portion of its length to receive the nut 16. Mounted upon the end of stud 14 to rotate thereupon is a sprocket-wheel 18, similar to sprocket-wheel 11 and provided with a hub 19, having an extended surface similar to hub 12. Sprocket-wheels 11 and 18 are arranged relatively to each other to receive thereon a sprocket-chain 20.

Cast with or secured to the links of sprocket-chain 20 and projecting therefrom are a series of pins 21. In the form shown a pin 21 is provided for each link. Upon each pin is loosely mounted a block 22, having projecting arms or fingers 23 24, cast therewith or suitably secured thereto in any suitable manner. Fingers or prongs 23 24 are preferably curved in the direction in which the sprocket-chain moves in operation, as will more fully hereinafter appear and for a purpose presently to be described. They are also preferably pointed at the ends, as shown. Blocks 22 are spaced a distance apart sufficient to permit each block to freely rock upon its supporting-pin independently of the other blocks at the desired point in the operation of the machine and in order to avoid interference with the flexibility of the chain. The extended surfaces 12 and 19 of sprocket-wheels 11 and 18 afford support for blocks 22 during the passage therearound of chain 20, as clearly shown in Figs. 1 and 3, and during the travel of chain 20 between the sprocket-wheels the said blocks 22 are supported on flat plates 25 and 26, suitably cast with or secured to lugs 27 28 on the framework 6 of the machine, whereby they are held firmly in a vertical position and are prevented from tilting or rocking on their supporting-pins 21, and hence prongs or projecting fingers 23 24 are held erect. Plate 26 is provided with an offset or depressed portion midway the length thereof, as indicated at 29, (see Fig. 1,) in order to release blocks 22 and permit them to be tilted or rocked upon their supporting-pins.

In order to take up the slack in chain 20 and maintain said chain taut, I provide an adjusting-screw 30, whereby stud or bolt 14 may be adjusted in slot 13. (See Fig. 3.)

Adjacent to the path in which projecting ends of fingers 23 24 travel I arrange a hollow tube 31, adjustably supported at one end in a lug 32, forming part of the framework. A set-screw 33 is provided to secure said tube in adjusted position. The other end of said tube is arranged to be supported in an arm 34, bolted or otherwise suitably secured to a lug 35 of the framework. (See Fig. 1.) The front end of tube 31 is preferably curved or bent slightly away from the path of travel of the projecting ends of fingers 23 24, as indicated at 36. The tube is provided with flanges 37 at the end thereof, forming an open-sided channel presented toward the path of travel of the finger-points 23 24. A thin knife-blade 38 is provided, and the cutting end 39 is preferably turned or curved in a direction opposite to that in which the extreme end of tube 31 is bent, and said cutting end is arranged to be received in the channel formed by flanges 37. The rear end of blade 38 is slotted, as at 40, and through said slot is adapted to pass a set-nut 41, whereby said blade may be adjusted lengthwise, as may be desired. The upper end of supporting-arm 34 is preferably bifurcated, as shown, (see Fig. 5,) and knife-blade 38 is arranged within the bifurcation.

In order to rigidly hold the knife-blade in place in the end of supporting-arm 34, I perforate the bifurcated ends of said supporting-arm and also the knife-blade and pass through said perforations a pin 42, as shown. The rear end of tube 31 may be screw-threaded or otherwise constructed, as at 43, to receive a hose-pipe, whereby a jet of water may be fed through said tube.

The projecting end of supporting-arm 34 is arranged adjacent to the offset or depressed portion 29 of plate 26 and in the path of travel of fingers 23 24 and may be pointed in a direction opposite to that in which said fingers travel. By this construction the pointed end of supporting-arm 34 successively engages the fingers 23 24 of blocks 22 as the chain 20 carries said blocks along and thus causes the blocks and fingers to tilt or rock upon their supporting-pins.

The operation is as follows: The end of the entrail to be ripped or cut is forced onto the outwardly-bent end of tube 31 by hand. Power is applied through fast pulley 10 to rotate shaft 8, and hence chain 20 is caused to travel. The outwardly-projecting forwardly-bent ends of fingers 23 24 engage the entrail and draw or feed it telescopically over tube 31 and against the cutting-edge of knife 38, by which the entrail is ripped. A jet of water delivered through tube 31 into the entrail serves to inflate it somewhat to facilitate the feed thereof and also serves to assist in washing out or removing the contents of the entrail. The pointed ends of fingers 23 24 remain in engagement with the entrail until said fingers reach the pointed ends of the arms forming the bifurcation in supporting-arm 34. This point is reached at the same time the blocks 22 arrive opposite the offset portion of supporting-plate 26, and hence the blocks 22 are permitted to tilt, and the points of fingers 23 24 are disengaged from the entrail by scraping over the oppositely-pointed ends of said supporting-bar 34. In the form shown I have provided each block 22 with a pair of fingers 23 24, which are arranged to straddle tube 31 and knife-blade 38, and hence the entrail is firmly grasped or engaged on each side of the knife. The parts are arranged and proportioned in such manner that three or more pairs of entrail-feeding fingers are constantly in engagement with the entrail, and hence an effective, constant, and steady feed of the entrail to the stationary cutting-knife is assured. In order to firmly support the feed-chain 20 adjacent to the cutting-knife, I provide a supporting-plate 44 therefor, upon which said chain is adapted to ride.

Reference-sign 45 designates a guard-plate pivoted or hinged, as at 46, and arranged over the projecting pointed fingers 23 24 as they pass over the sprocket-wheel 18, and the end of said guard is arranged in close proximity to the end of tube 31, on which the end of the entrail is first fed. By this construction the hands of the operator are effectually protected against injury by coming in contact with the pointed fingers 23 24, and at the same time access to this part of the machine for inspection, cleaning, or repair is rendered easy by raising said pivoted guard.

Any ordinary form of belt-shifting device may be employed for shifting the driving-belt of the machine from one of the pulleys 9 10 to the other, as indicated at 47.

It will be observed that the feed of the entrail is in a right line and a plurality of feeding-fingers spaced a considerable distance apart is constantly in engagement with the entrail. By this arrangement I am enabled to effect a more rapid and positive feed than is possible otherwise. Moreover, by the peculiar construction of the feed-chain above described the entrail is drawn by a rake-action over tube 31 and against the knife by the engagement therewith of one of a pair of fingers on each side of the knife and tube and the feeding-fingers are effectually disengaged from the entrails at the desired point. This form of traveling feeding device, in connection with a stationary knife, is particularly effective as compared with a rotary feeding device and a rotary knife. As is well known, entrails contain a large amount of gravel, which, coming in contact with the edge of a rotary knife, rapidly dulls the same, thus necessitating frequent sharpenings and consequently annoying delays. Moreover, in a rotary feed device only a comparatively short engagement of the feeding device with the entrail is possible, and in view of the texture of the entrail the feed thereof is exceedingly precarious and uncertain.

In my machine I produce an exceedingly effective device simple in construction, easily understood, and thorough in the accomplishment of its work.

While I have shown and described a specific form of mechanism embodying the principles of my invention, it will be understood that many variations and changes would readily suggest themselves to any one skilled in the art without departing from the spirit or scope of my invention. I do not confine myself, therefore, to the exact details shown and described; but,

Having now fully described an embodiment of my invention and explained the principles thereof and its mode of operation, what I claim as new and of my own invention, and desire to protect by Letters Patent of the United States, is—

1. In a machine for ripping entrails, a traveling feed device for the entrail to be cut, means for feeding said feed device in a right line during a portion of its travel, a support for the entrail and a cutter, arranged in the line of movement of said device; as and for the purpose set forth.

2. In a machine of the class described, a feed chain, arranged to move in a right line during a portion of its travel, a support for the entrail arranged in said line of travel, devices carried by said chain for engaging and feeding the entrail along said support, a knife, and means for actuating said chain; as and for the purpose set forth.

3. In a machine of the class described, a feed chain arranged to move in a right line during a portion of its travel, a tube arranged in said line of movement, and adapted to receive thereon the entrail to be cut, a knife, devices carried by said chain for engaging the entrail, and drawing the same over said tube and against said knife, and means for actuating said chain; as and for the purpose set forth.

4. In a machine of the class described a knife, a feed chain, devices carried by said chain for engaging the entrail to be cut and feeding the same against said knife, means for effecting a disengagement of the feeding devices with the entrail a support for the entrail while being fed and means for actuating said chain; as and for the purpose set forth.

5. In a machine of the class described, a knife, a traveling feed device, a support for the entrail and a scraper arranged in the path of travel of the feed device to disengage the entrail therefrom, and means for actuating said feed device; as and for the purpose set forth.

6. In a machine for ripping entrails a stationary knife, means for adjusting the same, a traveling feed device for feeding the entrails against the knife, a support for the entrail and means for actuating said feed device; as and for the purpose set forth.

7. In a machine for ripping entrails a stationary knife, a tube arranged adjacent thereto having the end thereof bent away from the knife and adapted to receive thereon the entrail to be cut, traveling feed devices arranged to travel in a path parallel with and adjacent to said support and past said cutter and adapted to engage the entrail and draw it over and along said tube and against the knife, and means for actuating said feed devices, as and for the purpose set forth.

8. In a machine of the class described, a framework, a shaft mounted thereon and means for rotating said shaft, a sprocket chain adapted to be actuated by said shaft, feed devices carried by said chain, adapted to engage the entrail to be cut and to feed the same, a support for the entrail and a cutter, combined and arranged as and for the purpose set forth.

9. In a machine of the class described a framework, a shaft and a stationary stud mounted in said framework, means for rotating said shaft, a chain mounted upon said shaft and stud and adapted to be actuated by said shaft, fingers carried thereby arranged to engage and feed the entrail to be cut, a support for the entrail and a knife; as and for the purpose set forth.

10. In a machine of the class described, a framework, a shaft and a stud mounted therein, means for rotating said shaft, sprocket wheels mounted on said shaft and stud, a sprocket chain arranged around said sprocket wheels, fingers carried by said chain adapted to engage the entrail to be cut, a support over which the entrail is fed, and a knife, all combined and arranged as and for the purpose set forth.

11. In a machine of the class described, a chain, means for actuating said chain, fingers carried thereby and adapted to engage and feed the entrails to be cut, an adjustable support over and along which the entrails are fed, and a knife, as and for the purpose set forth.

12. In a machine of the class described a knife, a tube arranged adjacent thereto, and a feed device for feeding the entrail to be cut over said tube and to said knife comprising a chain, means for actuating the same, and fingers carried by said chain and arranged to engage the entrail on opposite sides of the knife; as and for the purpose set forth.

13. In a machine of the class described, a cutter, means for feeding the entrail to be cut to said knife comprising a chain, pins projecting from said chain, engaging fingers loosely mounted on said pins, and means for actuating said chain; as and for the purpose set forth.

14. In a machine of the class described a cutter, means for feeding the entrail to be cut to said cutter, comprising a chain, pins projecting from said chain, blocks loosely mounted upon said pins and carrying projecting fingers adapted to engage the entrail and feed the same, means for maintaining said blocks in fixed position during the feed of the entrail, a support for the entrail, and means for actuating said chain; as and for the purpose set forth.

15. In a machine of the class described, a cutter, means for feeding the entrail to said cutter, comprising a chain pins projecting from said chain, blocks loosely mounted to rock upon said pins, a pair of projecting fingers carried by each block having their outer ends inclined in the direction in which said chain travels, means for maintaining said blocks in fixed position during the feed of the entrail, a support for the entrail, and means for actuating said chain; as and for the purpose set forth.

16. In a machine of the class described a cutter, a feed device comprising a chain carrying fingers inclined or bent in the direction in which the chain travels, means for actuating said chain, and a support over which the entrail is adapted to be fed; as and for the purpose set forth.

17. In a machine of the class described a cutter, a support for the entrail means for feeding the entrail to said cutter, comprising a sprocket chain, blocks loosely mounted, carried by said chain, and carrying feeding fingers, means for maintaining said blocks in erect position while said feeding fingers are in engagement with the entrails, means for tilting said blocks and for disengaging the fingers from the entrails and means for actuating said chain; as and for the purpose set forth.

18. In a machine of the class described, a framework, shafts mounted therein carrying sprocket wheels, said wheels having extended hubs, a sprocket chain mounted on said sprocket wheels having pins projecting therefrom, blocks loosely mounted thereon and having feeding fingers, said blocks adapted to rest upon and be supported by said extended hubs during the travel of said chain around said sprocket wheels, a knife, a support for the entrail and means for rotating one of said shafts; as and for the purpose set forth.

19. In a machine of the class described, a framework, shafts mounted therein, wheels mounted on said shafts, a chain carried by said wheels, pins projecting from said chain, blocks loosely mounted on said pins, plates carried by said framework and arranged between said wheels adapted to support said blocks in an erect position, a cutter, a support for the entrail and means for actuating one of said shafts; all combined and arranged as and for the purpose set forth.

20. In a machine of the class described a cutter, a support for the entrail to be cut and a feed chain arranged to travel in a path parallel with and adjacent to said support in combination with a guard for said chain; as and for the purpose set forth.

21. In a machine of the class described, a cutter, a support for the entrail to be cut and a feed chain, arranged to travel in a path parallel with and adjacent to said support in combination with a pivoted guard; as and for the purpose set forth.

22. In a machine of the class described, a cutter, a feed chain, a guide plate for said feed chain having a depressed or offset portion; as and for the purpose set forth.

23. In a machine of the class described, a cutter, a feed chain, loosely mounted feed fingers carried thereby, a supporting plate for said fingers provided with an offset or depressed portion; as and for the purpose set forth.

24. In a machine of the class described, a cutter, a support for the entrail to be cut, a feed chain, blocks loosely mounted thereon having feed fingers, a supporting plate for said blocks, having an offset or depressed portion, in combination with a scraper arranged adjacent to said offset portion and in the path of said fingers; as and for the purpose set forth.

In witness whereof I have hereunto set my hand this 2d day of February, 1895.

GEORGE A. LOWRY.

In presence of—
   M. I. CAVANAGH,
   S. E. DARBY.